May 15, 1962     H. E. PAULSON     3,034,727
BITUMINOUS DISTRIBUTOR
Filed April 24, 1959     2 Sheets-Sheet 1
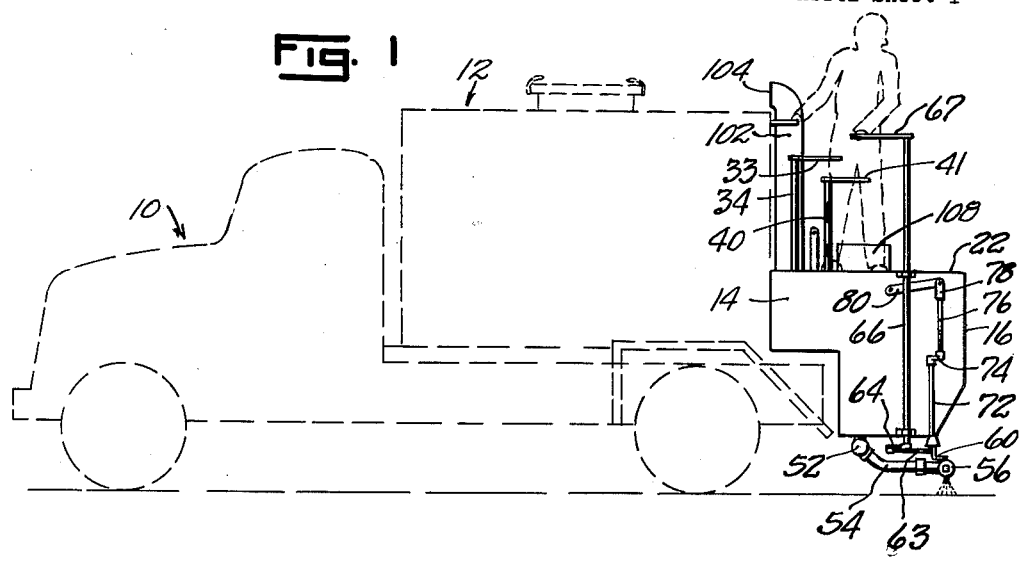
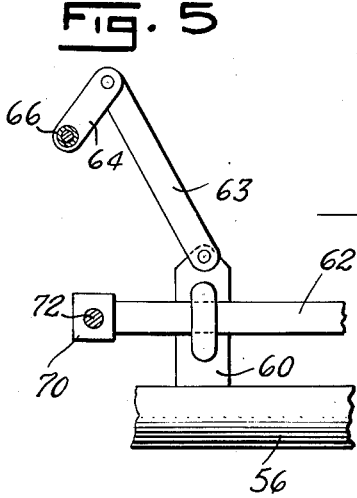
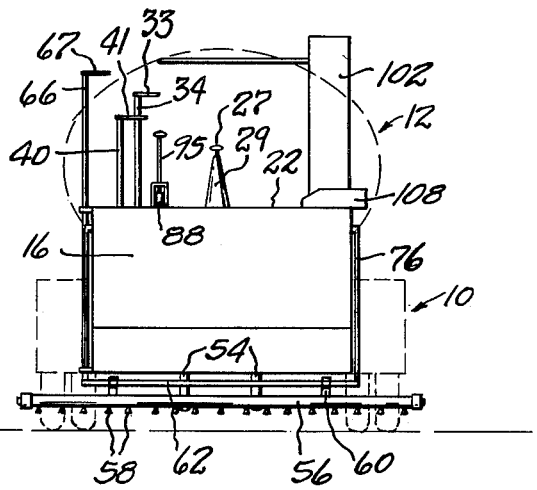
HOWARD E. PAULSON
INVENTOR.
BY Eugene C. Knoblock
ATTORNEY May 15, 1962   H. E. PAULSON   3,034,727
BITUMINOUS DISTRIBUTOR
Filed April 24, 1959   2 Sheets-Sheet 2

HOWARD E. PAULSON
INVENTOR.

BY Eugene C. Kniblock
ATTORNEY

United States Patent Office 3,034,727
Patented May 15, 1962

3,034,727
BITUMINOUS DISTRIBUTOR
Howard E. Paulson, 724 E. Woodside, South Bend, Ind.
Filed Apr. 24, 1959, Ser. No. 808,753
8 Claims. (Cl. 239—169)

This invention relates to improvements in bituminous distributors, and more particularly to a device by means of which bituminous material is distributed upon roadways.

Bituminous distributors are mounted upon motor vehicles and require a driver for the vehicle and an operator to control the distributor. The operator for the distributor rides at the rear of the vehicle in a position adjacent to the discharge outlet and the controls for the distributor. In such position it is usually difficult for the operator to view the road ahead to ascertain the conditions being encountered which may require change in the controls of the distributor, because the truck and the tank obstruct his vision. Hence the operator has difficulty in controlling the distributor properly.

Prior distributors have had other disadvantages stemming from the distribution of bituminous material through spray nozzles at a positive pressure which results in the formation of a fog at the point of discharge which tends to spread over the discharge area in such a manner that the operator is covered thereby and the fog also tends to enter the cooling system of the engine of the distributor so that the bituminous material in the cooling air tends rapidly to clog the engine.

It is the primary object of this invention to provide a bituminous distributor which eliminates the difficulties and disadvantages mentioned above, and in which the parts are so arranged as to provide a platform for an operator so positioned that the operator is protected from the fog which results from discharge of bituminous material and that the operator is enabled to observe conditions of the road ahead.

A further object is to provide a device of this character wherein the engine, the transmission and the pump of a distributor are arranged in convenient driving location at the rear of a vehicle and are enclosed within a fog free enclosure above the level of the spray discharge means.

A further object is to provide a device of this character having a novel cooling system for the distributor engine, having air inlet and outlet means so located as to minimize the possibility of any fog being circulated with the air through the device.

A further object is to provide a device of this character having an engine enclosure with air intake and air outlet means so proportioned to each other and to the capacity of the fan as to produce a positive pressure within the enclosure so as to insure a direction of air flow outwardly from the enclosure at all openings thereof and preclude the collection of bituminous fog within the enclosure.

A further object is to provide a device of this character with an enclosure for an engine and air-circulating means associated with said enclosure so constructed as to eliminate the need for filters.

A further object is to provide a device of this character having an engine for driving a pump, wherein bituminous circulating means leading to the pump are enclosed within an enclosure for the engine and pump so that bituminous lines leading to and from the pump are maintained at a proper operating temperature to avoid clogging or setting of the material when the device is operated in cold weather.

Other objects will be apparent from the following specification.

In the drawings:

FIG. 1 is a side elevation of the device mounted upon the rear of a vehicle having a bituminous tank; wherein the vehicle and tank are illustrated in broken lines;

FIG. 2 is a rear view of the device illustrating the relation of the parts thereof to a vehicle and tank in dotted lines;

FIG. 5 is a fragmentary detail view of the means for adjusting the spring bar.

Figure 3:
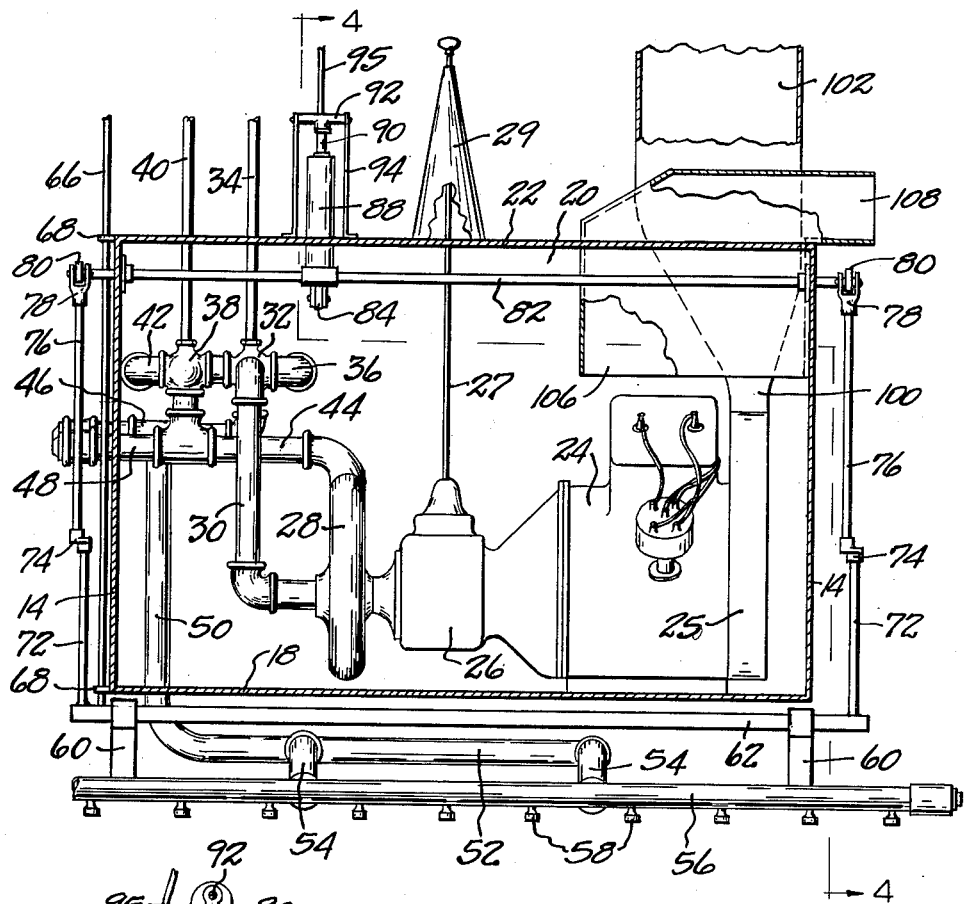
FIG. 3 is an enlarged rear view of the device with parts of the enclosure and of the air-circulating means shown in section.

Referring to the drawings which illustrate the preferred embodiment of the invention, the numeral 10 designates a vehicle, such as a motor truck, having mounted thereon a tank 12 adapted to contain bituminous material to be distributed by the device. Suitably mounted upon the chassis of the vehicle at the rear thereof is an enclosure having side walls 14, rear wall 16, bottom wall 18, front wall 20, and a top wall 22. The top wall 22 constitutes a platform located at such a level that a man can stand thereon, as illustrated in dotted lines in FIG. 1, so as to have full vision above the tank 12 to the road ahead.

The chassis of the vehicle or the enclosure serve to support an internal combustion engine 24 with which is associated a suitable drive transmission 26 in turn serving to drive a pump 28. Suitable controls for the engine 24 and the transmission 26 are provided for operation by an operator standing upon the platform 22, and these controls may include a control rod 27 for operating the transmission 26, the same extending upwardly through platform 22 and preferably being enclosed by a flexible member 29 accommodating manipulation of the lever 27. The pump inlet conduit 30 is connected to a valve 32 having an operating rod 34 extending vertically and rotatably through the platform 22 to a hand lever 33 within convenient reach of an operator standing upon the platform 22. Valve 32 is connected with a conduit 36 communicating with the bottom of the tank 12 and is also connected by suitable conduit with a valve 38 having a rotatable operating lever 40 extending vertically through the platform 22 and terminating in a hand grip 41 within reach of an operator standing on the platform 22. Valve 38 controls a conduit 42 communicating with the tank and a conduit 44 normally provided with a sealing cap and communicating with the outlet of the pump 28. Valve 32 communicates with a conduit 46 providing connection with a loading hose extending to a supply of bituminous material to accommodate filling of the tank 12. Conduit 44 may have connected therewith a conduit 48 normally provided with a sealing cap and adapted to provide connection with a hose providing a hand patching bituminous outlet.

Bituminous outlet conduit 50 branches from the conduit 46 and extends downwardly through an opening in the bottom 18 of the enclosure and thence extends substantially horizontally at 52. During filling of tank 12 by connection of conduit 46 with a loading hose, the suction of the pump, coupled with the direction in which conduit 50 extends from conduit 46, cause flow into the tank and prevent discharge through the conduit 50. Inasmuch as line 50 is open to atmosphere only through the nozzles 58 during filling, only a small amount of air is drawn into line 50 and the pump 28 during operation of the pump, and this may reduce the efficiency of the pump somewhat during filling. As well understood in the art, the pump efficiency during filling can be improved by providing means (not shown) such as a shut-off valve in line 50, for preventing suction of air into the system during filling. A pair of feed lines 54 communicate with conduit 52 preferably by means of ball joint fittings and in turn communicate with a spray bar 56 having a plurality of spray nozzles 58 mounted thereon and projecting downwardly.

Spray bar 56 is carried by supporting brackets 60 spaced laterally and depending from a transverse bar 62 to which the brackets 60 have a sliding connection. Brackets 60 have connection with a link 63 pivoted to a crank arm 64 on the lower end of a rotatable vertical rod 66 journaled at 68 to the sides of the enclosure. Rod 66 has hand grip 67 at its upper end above the level of the enclosure, by means of which the shaft 66 may be rotated to cause lateral swinging of the brackets 60 and the spray bar 56 relative to the vehicle.

Figure 4:
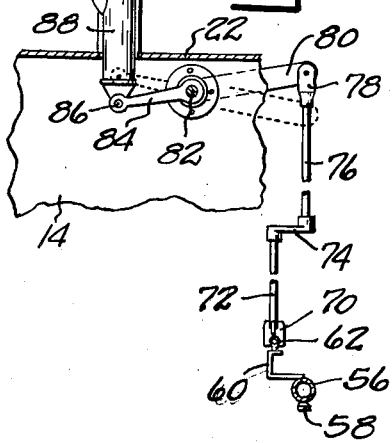
FIG. 4 is a sectional view taken on line 4—4 of FIG. 3.

Any suitable means for controlling the elevation of the spray bar 56 may be provided, and one such means is illustrated in FIG. 4. In this construction brackets 70 carried by the ends of the cross bar 62 are suspended from upright members 72, each having a crank or offset portion 74 which is carried by the lower end of an upper member 76 carrying a clevis 78. Clevis 78 is pivoted on the end of one of a pair of levers 80 projecting laterally from each end of an elongated cross shaft 82 which preferably is journaled suitably in opposite side walls 14 of the enclosure to extend partially therethrough adjacent the upper end thereof. Crank arm 84 is mounted upon the shaft 82 and, as here shown, is pivotally connected at 86 to a clevis carried by the lower end of a cylinder 88 mounting a piston therein having a piston rod 90 which is pivotally connected at 92 to a bracket 94 carried by the platform 22, said cylinder 88 extending through an aperture in said platform. Conduit 95 leads to a source of fluid under pressure for operating the piston (not shown) within cylinder 88 for the purpose of controlling the elevation of the parts as between the full line position and the dotted line position shown in FIG. 4.

The engine 24 has a fan housing 25 with which communicates an air intake conduit 100 extending vertically therefrom through the platform 22 and thence upwardly at 102 preferably to a level above the top of the tank 12, as seen in FIG. 1, at which it has a forwardly directed air intake 104. A hood 106 within the enclosure preferably adjacent the engine 24 extends through an opening in the platform 22 adjacent and preferably rearwardly spaced from air conduit 102 and communicates with a laterally extending discharge outlet 108.

The enclosure is of such size and location as to accommodate the aligned driving arrangement of the engine, the transmission and the pump, and also accommodates the valves and parts of the conduits connecting the tank, the pump and the valves. The enclosure is substantially completely closed so that the occurrence of openings therein is held at a minimum, thereby rendering the enclosure substantially proof against entry of fog therein except at the air intake and outlet conduits 102 and 108. The spray bar 56 being located below the level of the enclosure tends somewhat to protect the upper part of the housing from the fog which develops upon pressure discharge of the bituminous material. Consequently, when the operator stands upon the upper surface 22 of the housing and uses it as a platform, he is somewhat protected from the fog by the body of the enclosure. The enclosure may be made of any height and preferably is at a height sufficient to insure that a man of everage stature standing thereon will be able to look overe the top of the tank 12 to the roadway ahead of the vehicle. The various controls for the engine, the transmission, the pump, the valves and the distributor adjusting means are all located for operation in a convenient manner by an operator standing on the platform. The engine, the transmission, the pump and other operating parts within the enclosure must be accessible for repair, which requires that one or more of the walls or panels of the enclosure be shiftable or removable, as by pivotal mounting thereof, as will be obvious.

The location of the engine within the enclosure requires provision for cooling of the engine. The air intake conduit has its inlet 104 facing forwardly and spaced above the level of the tank 12 so that it scoops air as the vehicle moves forwardly. This quite positively assures against the posibility of any fog of bituminous material being blown into the intake 104 of the conduit. The outlet 108 may be at a lower level than the intake as shown, and thus will be closer to the area in which fog can occur. In order that fog will be prevented from entering the outlet 108, the size of the outlet 108 will be so related to the size of the inlet and to the air flow capacity produced by the fan of the engine that there will be a positive outward flow of air through the outlet 108 at all times. Such a positive outward flow of air from the outlet 108 will expel from the vicinity of that outlet any bituminous fog which may collect thereat and thus will insure against the collection of bituminous fog within the interior of the enclosure.

The arrangement and position of the inlet and outlet, the forward opening of the inlet mouth 104 and the air pressure at the outlet all combine to protect against the entrance of fog in the enclosure, even in windy conditions, and in cases where the direction of the wind is the same as the direction of travel of the vehicle. Thus there is no need for the use of filters in the air intake and outlet openings to exclude the fog from the engine cooling system. This eliminates the expense of the filter and also eliminates the problem of cleaning filters or of frequently replacing filters. The elimination of filters is important in an apparatus of this character since filters used in such apparatus must usually be replaced daily or even more frequently in order to provide an efficient air-circulating system for cooling of an enclosed engine.

The proportion of the sizes of the air intake and the air outlet in the device to each other and the rate of air flow of a fan are such as to somewhat retard the rate of expulsion of air through the outlet 108. This results in the occurrence of a slight positive air pressure within the enclosure at all times during which the engine operates. The occurrence of this internal air pressure within the enclosure insures that any apertures in the enclosure, through which bituminous fog might tend to enter under normal conditions, will serve merely as air discharge means. In other words, since air is constantly flowing through any apertures in an outward direction, any fog which exists in the vicinity of the enclosure apertures is dispersed by the air issuing from the apertures.

While the enclosure has air circulating therethrough tending to cool the engine, it will be apparent that this air is heated by the engine as it circulates from the inlet to the outlet and through the enclosure. The heat transfer is sufficient to prevent overheating of the engine and also is sufficient to insure that the pump 28, the valves 32 and 38 and the various conduits located within the enclosure will be maintained at a temperature sufficiently high to avoid the possibility of clogging thereof as a result of setting of the bituminous material when the device operates in cold weather. In this way, only the outlet line 52 and the spray bar are exposed to ambient temperature, but the length of travel of the bituminous material in the exposed conduits is comparatively short and the cooling of the bituminous material therein to such an extent that interference with free discharge of bituminous material would occur is quite unlikely.

It will be apparent that the occurrence or provision of the enclosure for the engine and related parts does not interfere with the means for shifting the spray bar either laterally or vertically as required for given operating conditions. Thus it will be apparent that rotation of the upright shaft 66 will accommodate lateral movement of the spray bar 56 relative to the enclosure even though the latter are located below the enclosure and the operator stands upon the top of the enclosure. Similarly, it will be apparent that the elevation of the spray bar 56 and suspension bar 62 can be varied by rocking the shaft 82, as by operation of suitable valve (not shown) in the line 94 leading to the cylinder 88, or by any other suitable means.

While the preferred embodiment of the invention has been illustrated and described, it will be understood that changes in the construction may be made within the scope of the appended claims without departing from the spirit of the invention.

I claim:

1. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, air inlet means and air outlet means communicating with said enclosure, said inlet means having a forwardly facing mouth located above the level of said tank, and air-circulating means actuated by said prime mover.

2. The combination defined in claim 1, wherein a fan is driven by said prime mover and the size of said outlet is so proportioned to the size of said inlet and to the air-circulating capacity of said fan as to restrict air discharge from said enclosure, whereby a slight positive air pressure exists in said enclosure when said fan operates.

3. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, said prime mover constituting an engine having a fan, an air inlet conduit projecting upwardly from said enclosure and having a forwardly facing inlet above the level of said tank, and an air outlet of lesser cross sectional size than said inlet and projecting laterally from said enclosure.

4. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, a shiftable support exteriorly of said enclosure and supporting said distributor, said distributor having a flexible connection with one of said conduits, and means for shiftably mounting said support including a manual controller supported by and projecting above said enclosure.

5. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, a vertically shiftable support adjacent the lower portion of said enclosure, and means carried by said enclosure for shifting said support, said distributor having a flexible connection with one of said conduits and being carried by said support.

6. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, a transverse elongated member carried by and positioned adjacent the lower portion of said enclosure, said distributor having a flexible connection with one of said conduits, brackets supporting said distributor and slidable on said transverse member, and means for sliding said brackets lengthwise of said elongated member.

7. In combination, a vehicle, a bituminous tank carried by said vehicle, a bituminous distributor, a pump, a prime mover for actuating said pump, conduits connecting said tank, pump and distributor, valve means for controlling flow of bituminous material in said conduits, and an enclosure housing said prime mover, pump, valve and portions of said conduit, a vertically shiftable elongated transverse member adjacent the lower part of said enclosure, means carried by said enclosure for shiftably mounting said support, said distributor having a flexible connection with one of said conduits, brackets supporting said distributor and slidable lengthwise on said transverse member, and means for sliding said brackets on said transverse member.

8. The combination defined in claim 7, wherein the top of said enclosure constitutes an operator's platform, and wherein each of said support shifting means and said bracket sliding means includes a controller projecting above the level of said platform.

References Cited in the file of this patent

UNITED STATES PATENTS

| | | |
|---|---|---|
| 1,694,806 | Yale | Dec. 11, 1928 |
| 1,778,551 | Etnyre | Oct. 14, 1930 |
| 2,076,780 | Haupt | Apr. 13, 1932 |